United States Patent [19]
Strauss et al.

[11] 3,895,126
[45] July 15, 1975

[54] RESIN BOTTLE CLADDING SYSTEM

[75] Inventors: Leopold Strauss, East Rockaway, N.Y.; Joseph T. Harmuth, Greenwich; Harry E. Lundberg, Westport, both of Conn.

[73] Assignee: Indian Head Inc., New York, N.Y.

[22] Filed: May 24, 1973

[21] Appl. No.: 363,517

[52] U.S. Cl. .................. 427/29; 117/18; 117/21; 117/94; 117/93.4R; 117/93.4NC; 117/105.4; 117/119.2; 117/119.4; 117/398; 118/66; 118/69; 65/60; 215/DIG.6
[51] Int. Cl. ............................................ B05b 5/02
[58] Field of Search ...... 117/17, 18, 21, 94, 93.4 R, 117/93.4 A, 93.4 N, 93.4 C, 104 R, 105.3, 117/105.4, 119.2, 119.4, 124 E; 118/66, 69, 118/630, 631, 632, 633, 634, 635; 65/60; 215/DIG. 6

[56] References Cited
UNITED STATES PATENTS

| | | | |
|---|---|---|---|
| 2,737,461 | 3/1956 | Heisler et al. | 117/19 |
| 3,132,027 | 5/1964 | Norton et al. | 117/119.4 |
| 3,197,324 | 7/1965 | Brooks | 117/21 |
| 3,208,869 | 9/1965 | Starr et al. | 117/18 |
| 3,371,430 | 3/1968 | Bowman | 34/217 |
| 3,415,673 | 12/1968 | Clock | 117/17 |
| 3,734,765 | 5/1973 | Russell et al. | 117/94 |
| 3,741,744 | 6/1973 | Bowman | 117/94 |
| 3,798,167 | 3/1974 | Kukla et al. | 117/119.4 |

*Primary Examiner*—Michael Sofocleous
*Attorney, Agent, or Firm*—Brumbauge, Graves, Donohue & Raymond

[57] ABSTRACT

A continuous processing system is disclosed wherein glass containers are coated with an exterior protective film of plastic resin which, when cured and quenched as prescribed, provides a clear transparent protective shield against bottle shattering either from internal gas pressures (as when containing carbonated beverages) or from rough external handling as by dropping on a hard surface. The process includes pre-heating of containers, applying powdered resin in a continuous electrostatic spray, passing the spray coated containers through a curing oven, air cooling the cured products and subsequent water quenching and drying before discharge from the system.

The foregoing abstract is not to be taken either as a complete exposition or as a limitation of the present invention. In order to understand the full nature and extent of the technical disclosure of this application, reference must be had to the following detailed description and the accompanying drawings as well as to the claims.

6 Claims, 2 Drawing Figures

3,895,126

RESIN BOTTLE CLADDING SYSTEM

BACKGROUND OF THE INVENTION

Ever since its inception the carbonated beverage industry has been plagued with the problem of bottles occasionally exploding due to excessive carbonation, or to hidden bottle defects or structural weakness. Many serious personal injuries have resulted from such accidents, and the law books are replete with reports of negligence actions for substantial damages incurred in this manner. Various efforts have been made in the past to insure greater integrity of glass containers used for such pressurized beverages, and one such is the bottle testing system and apparatus disclosed by Leo Strauss in application Ser. No. 272,325 filed July 17, 1972, now U.S. Pat. No. 3,771,649, and assigned to Automated Machine Systems, Inc., a related company to the assignee of the present application. While careful testing of bottles before filling may eliminate those which are structurally unsound, the process of the present invention provides added protection for glass containers which have passed the pressure test. The process of the invention can be carried out with the apparatus disclosed by Leo Strauss in a copending patent application, Ser. No. 352,682 filed Apr. 19, 1973 entitled "Bottle Conveyor System Including Adjustable Height Continuous Belt Conveyor and Positive Lock Spray Shielded Rotatable Bottle Carrier," assigned to the same assignee as the present application.

GENERAL DESCRIPTION OF THE INVENTION

In general, the process of the present invention entails preheating clean empty glass bottles in an oven to a temperature within the range of 150°F. to 350°F; transferring the heated bottles to a suitable continuous conveyor (which is preferably an overhead chain carrier whereby the bottles are suspended by neck-gripping means); passing the suspended bottles through an electrostatic spray station where an ionomer resin powder or similar plastic powder is deposited uniformly on the exterior surface of each bottle as it passes therethrough; thence passing the spray coated bottles through a curing oven at a temperature of 425°F. to 450°F. for approximately 30 seconds to one minute; subsequently air cooling the cured bottles to a temperature in the range of 250°F. to 225°F.; and then quickly quenching the bottles with cold atomized water to produce a 90°F. to 100°F. temperature drop (i.e., to 160°F. or less) within as short a time as possible, preferably witthin 1 minute.

OBJECTS OF THE INVENTION

A primary object of the invention is to render glass containers shatter-proof.

A more specific object of the invention is to provide a process for uniformly coating the exterior surfaces of glass containers with a thin film of resinous plastic.

A further object is to provide such a process which is continuous.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention, reference should be had to the following detailed description taken in connection with the accompanying drawings, in which:

FIG. 1 is a top plan view of a bottle cladding system for the practice of the invention; and FIG. 2 is a schematic flow-sheet drawing showing the successive stages at which the various steps of the process are performed.

DETAILED DESCRIPTION

Figure 1:
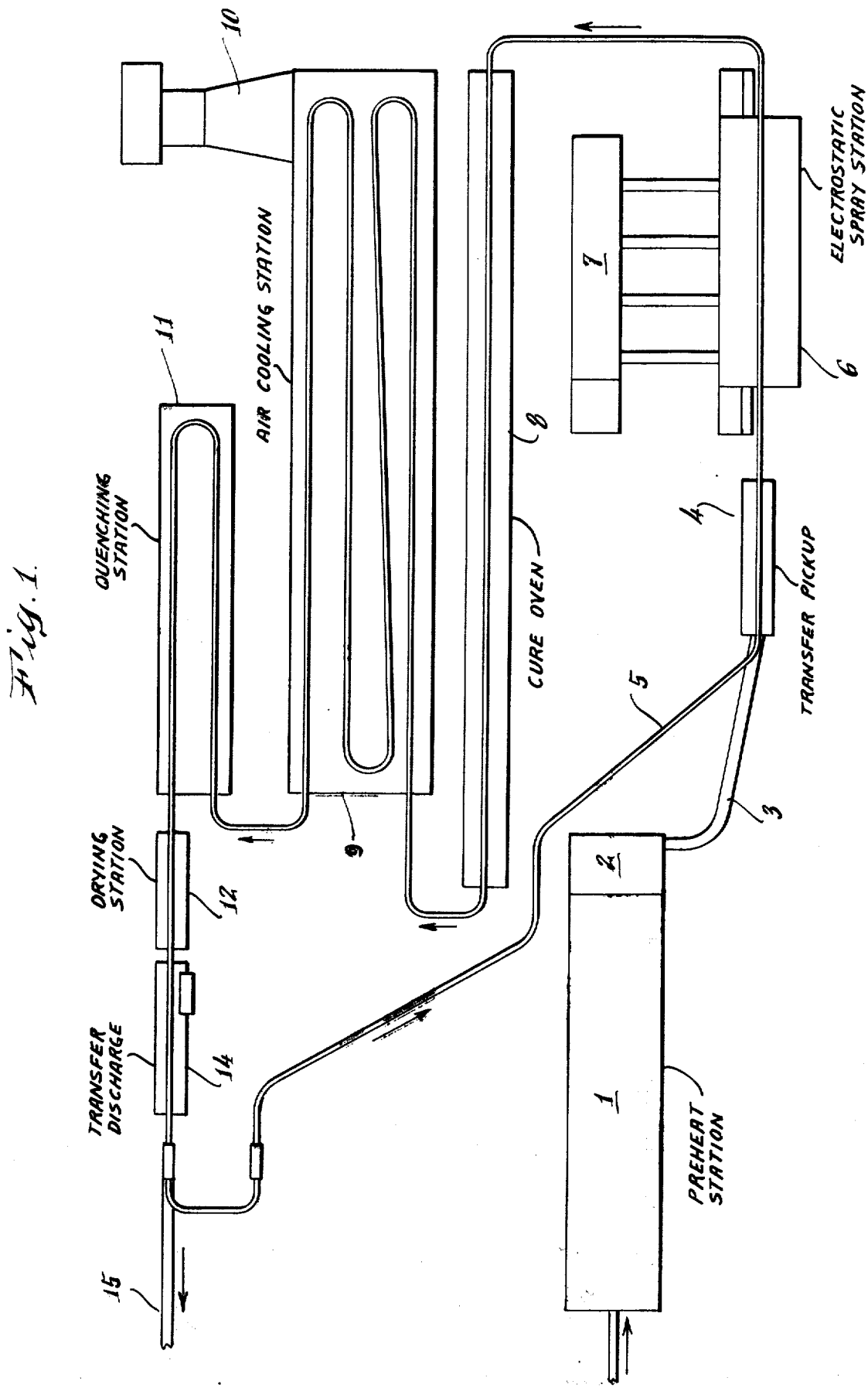

Referring first to FIG. 1 of the drawings, bottles to be coated first enter a preheat station 1 as indicated by the arrow from the left. Bottles may be loaded into preheat oven 1 directly from an uncaser at ambient room temperature or, if the plastic cladding process of the invention is to be used by a bottle manufacturer the input bottles may be transferred directly from the conventional annealing ovens at a temperature of approximately 300°F. The first station 1 is to assure that bottles to be processed are heated to at least 150°F, preferably to 250°F., and possibly to 350°F. The pre-heated bottles from station 1 are transferred by conventional means 2 into a single file row on a bottom support conveyor 3 by which they are conveyed to an elevated pick-up station 4 at which they are transferred to an overhead conveyor chain 5. The overhead pickup and transfer station 4 may be of the type disclosed in copending application Ser. No. 352,682, or may be of any other suitable construction. The uniformly spaced line of bottles on overhead carrier 5 then enters an electrostatic spray station 6 at which the bottles are rotated about their vertical axes, by means shown in the aforesaid apparatus application, while being sprayed with a finely divided powdered ionomer resin such as, for example, the product identified as "SURLYN" A D 5001 manufactured by E. I. DuPont de Nemours and Co. of Wilmington, Del. A powder recovery means 7 is provided at station 6 for recovering and recirculating excess powder which does not adhere to the surfaces of bottles passing through spray station 6. While the rotating hot bottles are passing through station 6 a uniformly thin coating of powdered resin is deposited on the exterior bottle surfaces, attraction of the powder to the glass being induced in part by an electrostatic potential difference between the bottles and the sprayed powder, and adherence of the powder on the glass results from the elevated temperature of the glass bottles which at this stage are heated to at least 150°F and are preferably running at 250°F. to 350°F. The time that each container remains within the electrostatic spray station 6 is approximately 10 to 20 seconds.

From spray station 6 the treated bottles emerge completely covered with an adherent layer of finely divided particulate resin powder and they pass directly into a relatively long curing oven 8 where they are exposed to radiant heat sufficient to raise the glass (and coating) temperature to the range of 425°F. to 450°F. Suitable heating elements for the curing oven 8 are quartz type continuous infrared heaters designed to operate at a radiant surface temperature of 1,600°F. The time that each bottle remains within curing oven 8, while passing therethrough at these temperatures, must be at least 30 seconds and up to 1 minute and is preferably 35 to 45 seconds. During this curing process the granular particulate resin previously deposited on the bottle surfaces is fused into a unitary film spreading completely over and around the exterior bottle surfaces. Upon emerging from the curing oven 8 the plastic coating on the bottles is opaque or cloudy, and somewhat thicker than desired for the end product.

From curing station 8 the conveyor 5 carries cured clad bottles into and through an air cooling station 9 where the bottle temperatures are gradually lowered to the range of 225°F. to 250°F. If only natural convection radiation cooling is relied upon at station 9 the cooling rate will approximate 50°F. per minute, thus requiring a dwell of 3 to 4 minutes to reach a temperature of 250°F. However, we have found that by employing a well designed high velocity convection cooling unit with an exhaust fan 10, having a capacity of 30,000 cubic feet per minute, the cooling rate can be increased to 100°F. per minute without producing undesirable stresses in normal sized bottles. In view of this doubling in cooling rate the dwell time can, therefore, be correspondingly cut in half, i.e., a dwell of 1½ to 2 minutes.

From air cooling station 9 the plastic clad bottles emerge at a temperature between 250°F. and 225°F and are carried into a cold water quenching station 11 where they are sprayed with atomized water to produce a 90°F. to 100°F. temperature drop as rapidly as possible. This sudden quenching temperature reduction causes a contraction of the plastic coating around the bottles and apparently produces a phase change in molecular construction and/or orientation resulting in a clarified transparent thin plastic coating on the glass. Because of the crystal structure change which takes place in the resin in this phase, the quenching step of the process is highly temperature sensitive. The critical minimum temperature below which the clarification process becomes inoperative is 210°F. While 250°F is considered a maximum desirable temperature for bottles entering the quenching stage 11, this upper limit is not so critical as the absolute lower limit of 210°F. but is important because at any higher temperature the sudden temperature drop brought about by the quenching operation may produce unwanted stresses and strains in the glass bottle structure. Maximum heat transfer for quick quenching within the prescribed temperature range is obtained by the use of high pressure fog nozzles which produce impingement of minute droplets. The primary heat sink reduction in the glass bottles passing through the quenching station requires approximately 30 to 45 seconds dwell therein, after which the clarified coated bottles are carried into a forced air drying station 12 where they are dried with air at ambient room temperature. From drying station 12 the finished bottles proceed to a transfer and discharge station 14 where they are released from the overhead carrier 5 and deposited upon a bottom supporting horizontal conveyor 15 which may be a conventional conveyor belt or any other suitable discharge conveyor.

Figure 2:
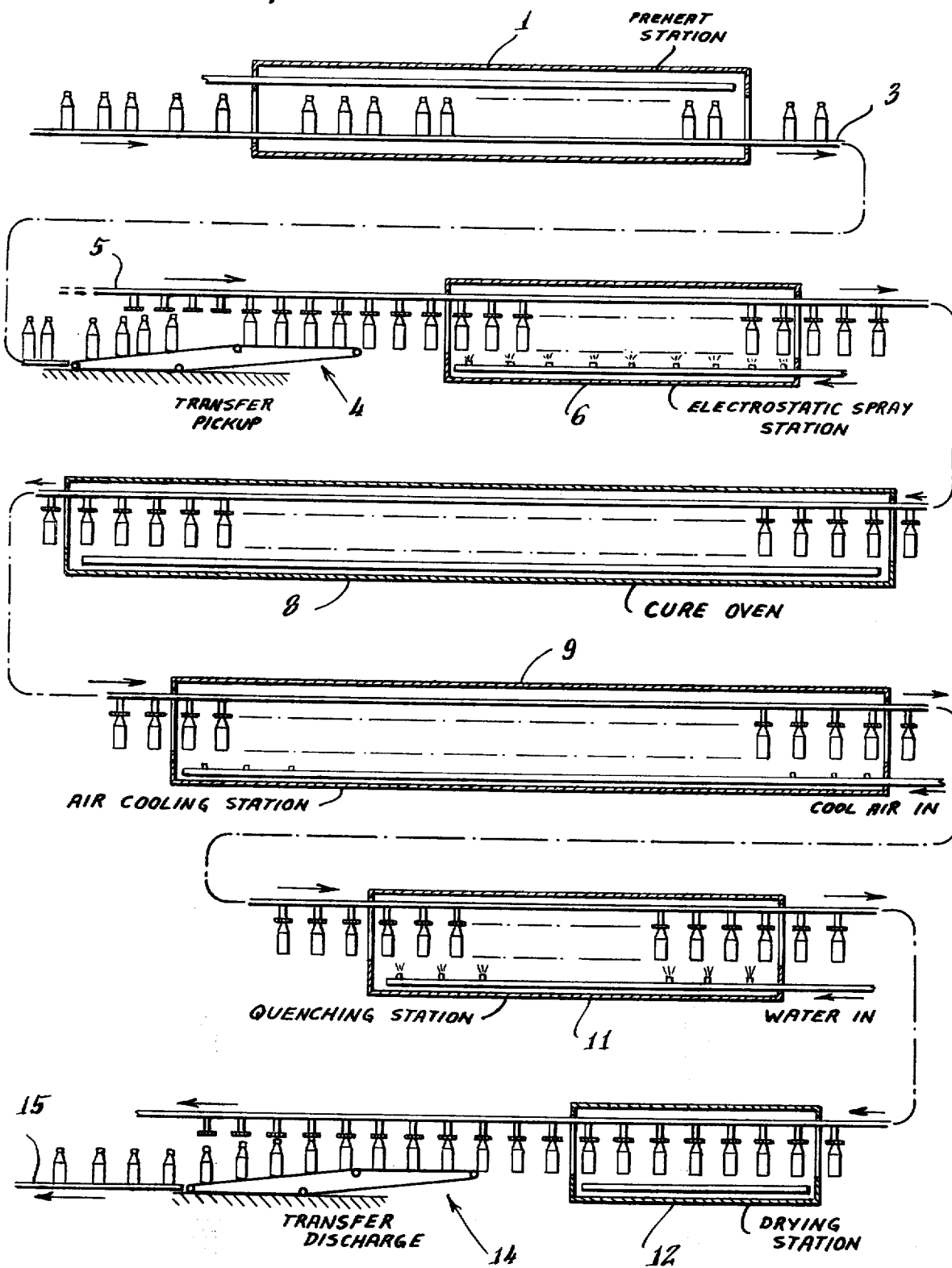

Referring now to FIG. 2 of the drawings the various and successive treatment stations and process stages are illustrated schematically in vertical views from the front. Starting with the preheat station 1 at the top of FIG. 2, the heated bottles are carried by bottom support conveyor 3 to transfer pick-up station 4 where they are engaged by overhead conveyor 5 which carries the uniformly spaced bottles through electrostatic spray station 6, thence into curing oven 8, followed by air cooling station 9, then into quenching station 11, from there to drying station 12, thence to transfer discharge station 14, and finally out of the system on horizontal conveyor 15. By means of the system as disclosed herein, with the prescribed dwell times within each of the successive processing stations, it is possible to completely coat, cure, clarify and dry bottles at a continuous rate of 200 bottles per minute. The finished products as discharged are completely covered with a uniformly thin, tough, adhered, transparent plastic coating, of 4.0 to 6.0 mil thickness within a tolerance of ± 0.5 mil, and the bottles so treated are totally shatterproof.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. A process for cladding glass containers with a resinous plastic coating which comprises the steps of preheating the containers to a temperature of from about 150°F. to about 350°F., electrostatically spraying said preheated containers with a resin powder to deposit a uniformly thin layer of particulate resin on the surfaces thereof, heating the thus coated containers to a temperature of from about 425°F. to about 450°F. to fuse the particulate resin coating into a unitary film, air cooling said hot clad containers to a temperature of from about 225°F. to about 250°F., and quenching said cooled clad containers with a cold water spray to produce a sudden temperature drop of from about 90°F. to about 100°F.

2. The process defined by claim 1 wherein said quenching of the cooled clad containers is with a high pressure fog to achieve maximum heat transfer.

3. The process defined by claim 1 wherein said quenching of the cooled clad containers is followed by air drying thereof.

4. A process for cladding glass containers with a resinous plastic coating which comprises continuously moving and rotating the containers having a temperature of from about 150°F. to about 350°F. through an electrostatic spray station and therein electrostatically spraying them with a resin powder, thence continuously moving the coated containers through a curing station and therein uniformly heating them to a temperature of from about 425°F. to about 450°F., thence continuously moving the hot clad containers through an air cooling station and therein cooling them to a temperature of from about 225°F. to about 250°F., and thence continuously moving the cooled clad containers through a quenching station and therein quenching them with a cold water spray to a temperature of about 160°F. or less.

5. The process defined by claim 4 wherein the containers are continuously moved through all said stations at a rate of about 200 containers per minute and each container is maintained within the electrostatic spray station, the curing station, the air cooling station and the quenching station for time periods, respectively, of from about 10 to about 20 seconds, from about 30 seconds to about 1 minute, from about 1½ to about 4 minutes and from about 30 to about 45 seconds.

6. The process defined by claim 4 wherein the coated containers are uniformly heated in the curing station by radiant heaters having a surface temperature of at least 1,600°F.

* * * * *